(12) United States Patent
Kusunoki et al.

(10) Patent No.: US 7,613,381 B2
(45) Date of Patent: Nov. 3, 2009

(54) VIDEO DATA PROCESSING METHOD AND VIDEO DATA PROCESSING APPARATUS

(75) Inventors: Yoshiaki Kusunoki, Tokyo (JP); Tsuyoshi Abe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 683 days.

(21) Appl. No.: 10/583,276

(22) PCT Filed: Sep. 7, 2004

(86) PCT No.: PCT/JP2004/012976
§ 371 (c)(1),
(2), (4) Date: Jun. 16, 2006

(87) PCT Pub. No.: WO2005/062614
PCT Pub. Date: Jul. 7, 2005

(65) Prior Publication Data
US 2007/0140647 A1    Jun. 21, 2007

(30) Foreign Application Priority Data
Dec. 19, 2003  (JP) .............................. 2003-422024

(51) Int. Cl.
*H04N 5/783* (2006.01)
(52) U.S. Cl. .............................. 386/68; 386/111; 386/52
(58) Field of Classification Search .................. 386/68, 386/111, 52
See application file for complete search history.

(56) References Cited

U.S. PATENT DOCUMENTS

| 6,011,663 A * | 1/2000 | Inoue et al. ..................... 360/48 |
| 7,469,011 B2 * | 12/2008 | Lin et al. ................ 375/240.23 |
| 2002/0015577 A1 | 2/2002 | Negishi et al. |
| 2002/0016970 A1 | 2/2002 | Negishi et al. |
| 2004/0223736 A1 * | 11/2004 | Lin et al. ........................ 386/68 |
| 2005/0163478 A1 * | 7/2005 | Suzuki ......................... 386/68 |

FOREIGN PATENT DOCUMENTS

| JP | 2001-359072 A | 12/2001 |
| JP | 2002-77811 A | 3/2002 |
| JP | 2002-77827 A | 3/2002 |
| JP | 2002-112194 A | 4/2002 |
| JP | 3304634 B2 | 5/2002 |

* cited by examiner

*Primary Examiner*—Thai Tran
*Assistant Examiner*—Helen Shibru
(74) *Attorney, Agent, or Firm*—Birch, Stewart, Kolasch & Birch, LLP

(57) ABSTRACT

I-frames are extracted from a normal play stream in an extract section (12), coding parameters and control parameters, such as VBV delay, related to a decoder buffer are modified for trick play in an I-frame picture data conversion processor (15), repeat pictures that display the same image content as the I-frames are generated and added following the I-frames in a repeat picture adder (16), and the transfer rate is controlled in a picture data size controller (17). This solves the problem that when trick play is executed between a server and a terminal on a network, if only I-frames are used the necessary network bandwidth may increase, a buffer may fail in the decoder that reproduces the trick play stream, and the reproduced video image may be disrupted.

10 Claims, 6 Drawing Sheets

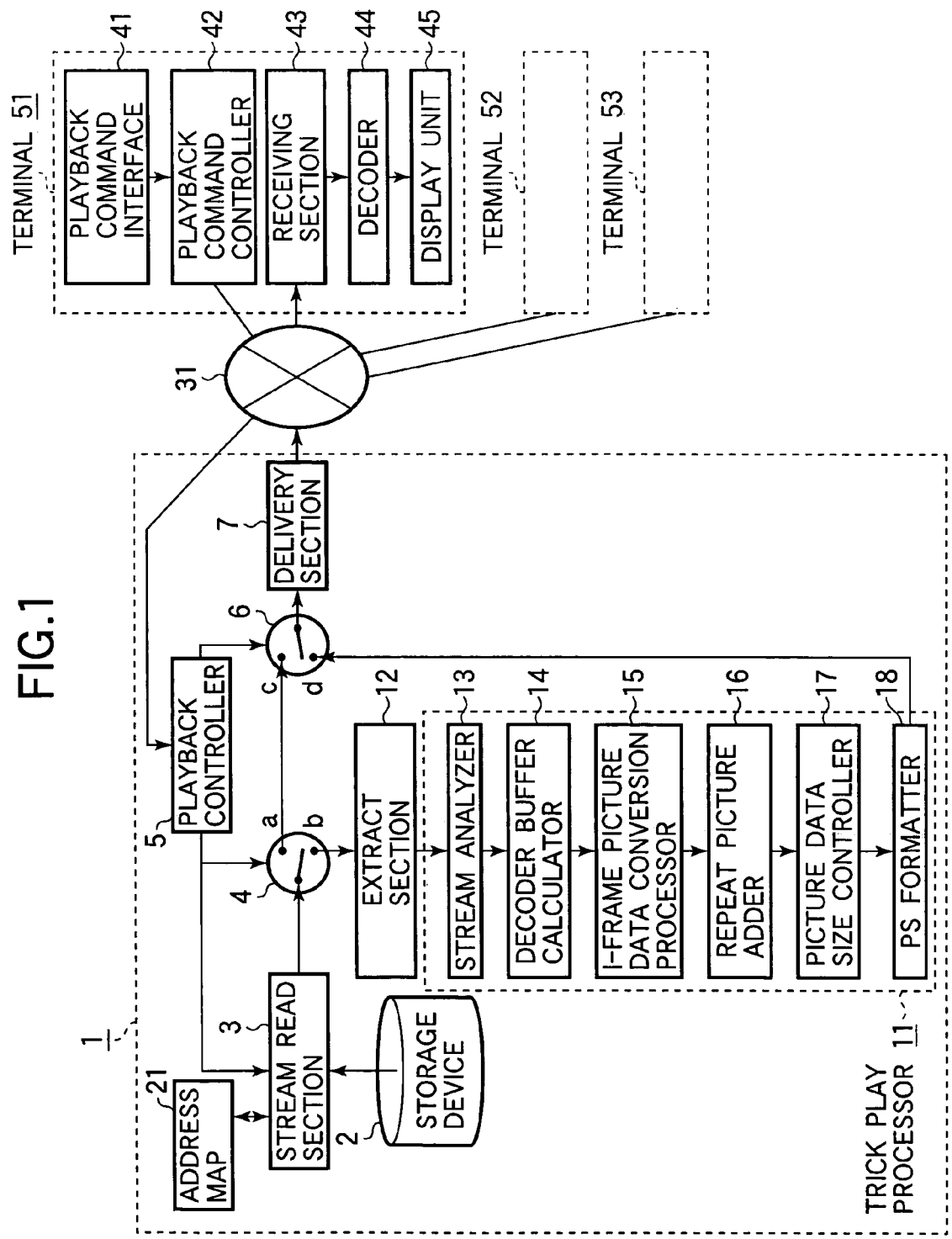

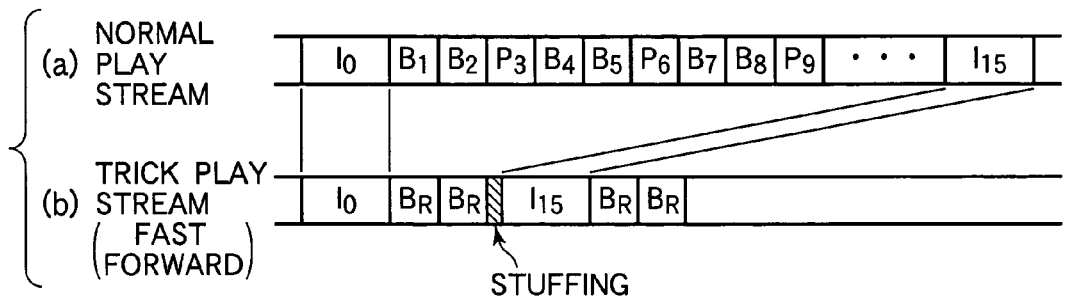
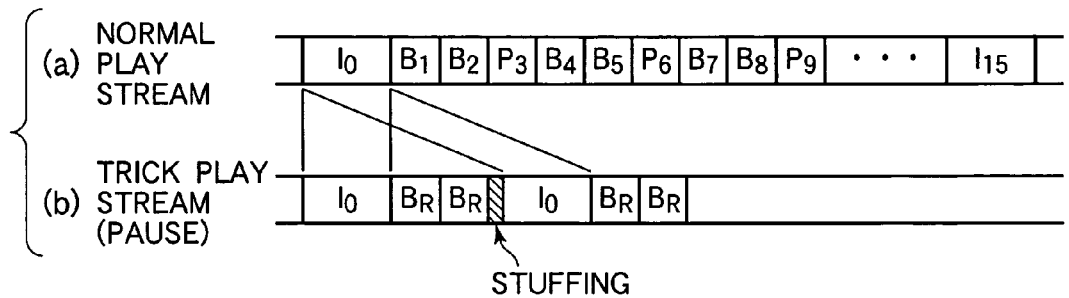
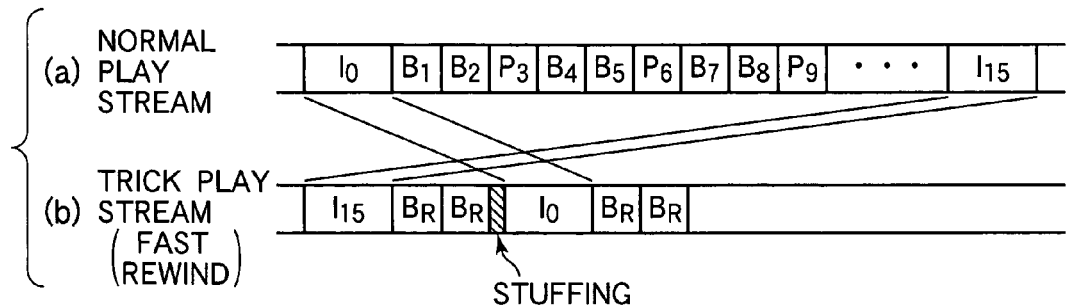

| VIDEO ID | GOD NUMBER | RECEPTION TIME STAMP |
|---|---|---|
| 1 | 1 | 00:22:18:25.028 |
| 1 | 2 | 00:22:18:25.527 |
| 1 | 3 | 00:22:18:26.024 |
| 1 | 4 | 00:22:18:26.523 |
| 1 | 5 | 00:22:18:27.029 |
| 1 | 6 | 00:22:18:27.528 |
| 1 | 7 | 00:22:18:28.022 |
| 1 | 8 | 00:22:18:28.525 |
| 1 | 9 | 00:22:18:29.027 |
| 1 | 10 | 00:22:18:29.523 |
| 1 | 11 | 00:22:19:00.026 |
| 1 | 12 | 00:22:19:00.522 |
| 1 | 13 | 00:22:19:01.021 |
| ... | ... | ...... |

VIDEO DATA PROCESSING METHOD AND VIDEO DATA PROCESSING APPARATUS

FIELD OF THE INVENTION

The present invention relates to a data processing method and data processing apparatus for implementing trick play modes such as fast forward, rewind, and pause, for example, in which the normal reproducing speed and/or direction is changed, in a video distribution system that records and stores video programs at a server and delivers stored video streams on demand to terminals that request them.

BACKGROUND ART

When an attempt is made to execute a trick play operation that changes the reproducing speed and/or direction of video streams compressed by MPEG-2 or the like (referred to below as normal play streams to distinguish them from trick play streams), the structure generally adopted in the past, especially in video reproducing systems using networks, has been one that extracts only the temporally intermittent intra-frame coded pictures (I-frames, which occur at intermittent intervals) from the normal play stream and delivers the extracted I-frames continuously to the terminal, where they are reproduced after being received.

With the conventional method above, however, since only the I-frames are extracted from the normal play stream, the result is sometimes a stream that departs from the usual MPEG-2 structure. A consequent problem has been that to enable reproduction of a trick play stream consisting only of I-frames, some sort of contrivance has had to be provided in the decoder at the receiving end.

Since only the I-frames, which have a large code size, are extracted and delivered continuously, the amount of code transferred per unit time (the transfer rate) is extremely large; this has led to problems such as the overflow of buffers on the transfer path (multiplexer and demultiplexer buffers, for example), the exceeding of network bandwidth limits, and the overflow of decoder buffers at the receiving end. To enable the transfer of trick play streams with increased transfer rates, it has therefore been necessary to expand network bandwidth and increase the memory size of buffers on the transfer path.

The network bandwidth problem is especially serious; although it depends on the code size of the I-frames, trick play methods that use only I-frames generally need about three times as much bandwidth as needed for normal play. Practically speaking, however, it would be difficult to increase bandwidth just to accommodate trick play. One method of dealing with this problem is to provide a separate trick play stream, but although this is simple in terms of system configuration, it is problematic because, since a trick play stream has to be prepared separately in addition to the normal play stream, the amount of stored data increases and the normal play stream and the trick play stream have to be managed on a related basis.

A method of addressing these problems by distributing data with repeat pictures, coded as macroblocks having zero motion vectors and zero prediction error, inserted following the intra-frame or intra-field coded data in a trick play stream has been proposed (see, for example, Patent Document 1). When trick play is executed by this method of inserting repeat pictures, the transfer rate is greatly reduced, because I-frames of large code size are followed by repeat pictures of very small code size; an increase in the transfer rate is thereby prevented, and it is not necessary to provide a large memory for trick play. The reproduced trick play stream moreover has the same syntactic structure as a normal play stream, so there is no need to add separate logic and circuitry to process trick streams, or to switch over to special logic during trick play.

A method of generating data during a trick play session between a server and a terminal over a network has been proposed in which, when trick play is performed, a trick play stream is assembled from I-frames extracted from the normal play stream and from stored repeat picture data, and stuffing is inserted following the repeat pictures according to the VBV delay (the residence time of data in the decoder buffer) of the extracted I-frame data so as not to produce a failure of the VBV buffer (Video Buffering Verifier buffer: a virtual buffer for controlling the amount of code generated) (see, for example, Patent Document 2).

Patent Document 1: Japanese Patent No. 3304634 (p. 10, FIG. 1)

Patent Document 2: Japanese Patent Application Publication No. 2002-77811 (p. 12, FIG. 1)

DISCLOSURE OF THE INVENTION

Problems to be Solved by the Invention

However, even though the simple insertion of repeat pictures following I-frames in the prior art causes no problems in the frame data in the trick play stream, when a continuous series of images is viewed, their encoded parameters may be inconsistent. For example, if the reproducing sequence, transfer rate, and VBV delay parameters coded in the original normal play stream are not adapted to produce values suited for the reproduced trick play stream, the trick play stream will not be reproduced correctly, and as a result the reproduced picture may be disrupted. A particular problem is that if the VBV delay value is incorrect, a decoder buffer failure may occur at the receiving end, or if there is a multiplexer on the transfer path, an error may occur in the multiplexing process. The VBV delay must normally be determined by a complex computational process involving simulation of the VBV buffer, but considering system load, this has been impractical.

The prior art that inserts stuffing following the repeat pictures has a complex program structure and is not suitable for systems that process many streams concurrently in real time, because the repeat pictures must be prepared beforehand and the trick play status and the status of the original stream must be constantly monitored. Since the VBV delay coded in the normal play stream is also used in the trick play stream, stuffing of the same data size as for the normal play stream is carried out. Consequently, although it is possible to prevent VBV buffer failure, it is not possible to reduce or even control the transfer rate of the trick play stream. The images and compression parameters of the original stream that are embedded in the trick play stream retain the values they had in the normal play stream, and are not adapted to fit the trick play stream, which may therefore depart from the general rules for MPEG-2 streams. Consequently the reproduced image may be disrupted, or multiplexing may fail in the multiplexer.

In the prior art of trick play, accordingly, since the coding parameters are not adapted when the trick play stream is generated from the normal play stream, in a trick play session executed between a server and a terminal on a network, if only I-frames are used, the necessary network bandwidth increases, a decoder buffer may fail, and the image reproduced from the trick play stream by the decoder may be disrupted.

The present invention addresses these existing problems and provides a video data processing method and video data processing apparatus that experience little image disruption when trick play is carried out via a network.

Means of Solution of the Problems

The invented video data processing method, which generates a trick play stream with an altered reproducing speed and reproducing direction from a video stream coded using frame-to-frame prediction, comprises:

a step of selectively extracting intra-frame coded pictures from the video stream, conforming to the speed and direction of the trick play stream to be reproduced;

an analysis step of analyzing a coding parameter of the extracted intra-frame coded pictures;

a modification step of modifying the coding parameter according to said speed and direction; and a generating step of generating the trick play stream by generating repeat pictures displaying content identical to the extracted intra-frame coded pictures and adding the repeat pictures following the intra-frame coded pictures with the modified coding parameter, the intra-frame coded pictures with the modified coding parameter being selected in their order of data transfer according to said reproducing speed and reproducing direction.

The invented video data processing apparatus, which generates a trick play stream with an altered reproducing speed and reproducing direction from a video stream coded using frame-to-frame prediction, comprises:

means for selectively extracting intra-frame coded pictures from the video stream, conforming to the speed and direction of the trick play stream to be reproduced;

analysis means for analyzing a coding parameter of the extracted intra-frame coded pictures;

modification means for modifying the coding parameter according to said speed and direction; and generating means for generating the trick play stream by generating repeat pictures displaying content identical to the extracted intra-frame coded pictures and adding the repeat pictures following the intra-frame coded pictures with the modified coding parameter, the intra-frame coded pictures with the modified coding parameter being selected in their order of data transfer according to said reproducing speed and reproducing direction.

EFFECT OF THE INVENTION

According to the present invention, intra-frame coded pictures are selectively extracted from a video stream in conformance to the speed and direction of the trick play stream to be reproduced, the coding parameters of the intra-frame coded pictures are analyzed, a coding parameter is modified in conformance with said speed and direction, repeat pictures that display the same image content as the intra-frame coded pictures are generated, and the repeat pictures are added following the intra-frame decoded pictures with the modified coding parameters in their order of data transfer, with the effect that image disruption does not occur when a trick play stream is reproduced via a network.

BRIEF DESCRIPTION OF THE DRAWINGS

FIG. 1 is a block diagram schematically showing a video distribution system equipped with video data processing apparatus according to a first embodiment of the invention.

FIG. 2 illustrates (a and b) the structure of a fast-forward play stream in the first embodiment of the invention.

FIG. 3 illustrates (a and b) the structure of a pause stream in the first embodiment of the invention.

FIG. 4 illustrates (a and b) the structure of a fast-rewind play stream in the first embodiment of the invention.

Figure 5:
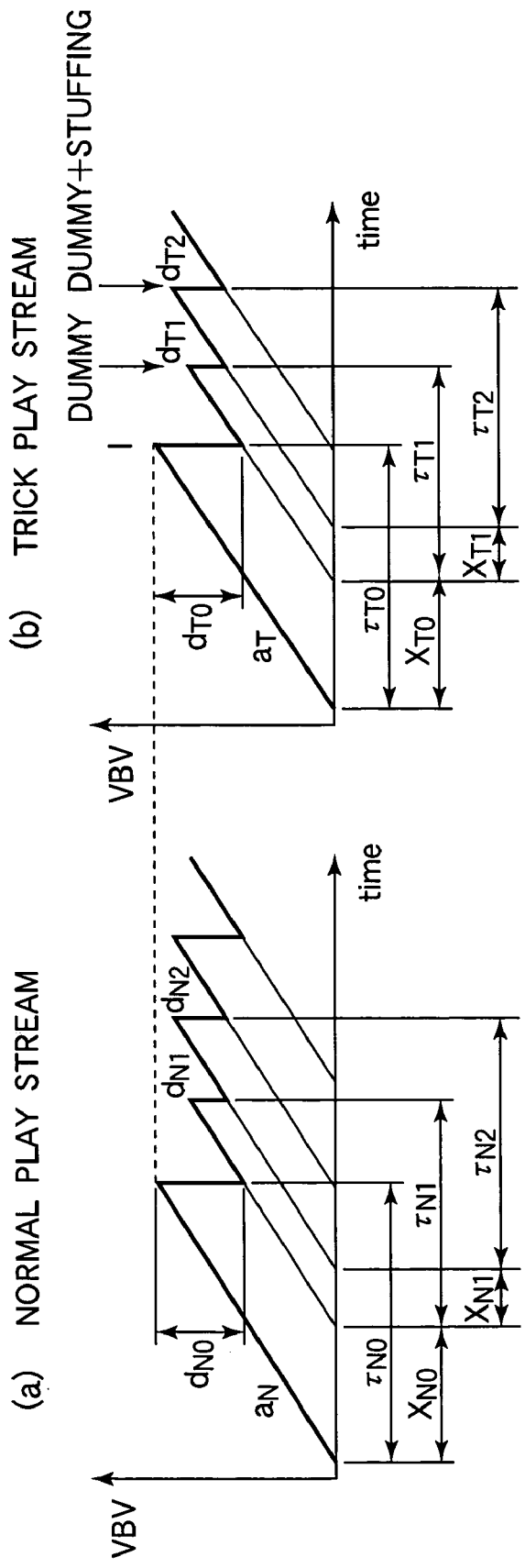
FIG. 5 illustrates (a and b) VBV buffer occupancy changes in the first embodiment of the invention.

EXPLANATION OF REFERENCE CHARACTERS 1 server, 2 storage device, 3 stream read section, 4 switch, 5 playback controller, 6 switch, 7 delivery section, 11 trick play processor, 12 extract section, 13 stream analyzer, 14 decoder buffer calculator, 15 I-frame picture data conversion processor, 16 repeat picture adder, 17 picture data size controller, 18 PS formatter, 21 address map, 31 network, 41 playback command interface, 42 playback command controller, 43 receiving section, 44 decoder, 45 display unit, 51, 52, 53 terminals, 100 network, 101, 102, 103 cameras, 111, 112, 113 terminals, 120 server, 121 request control module, 122 stream receive module, 123 stream database, 124 stream deliver module, 125 storage module, 126 trick play module, 127 hard disk drive, 131 I-frame buffer, 132 stream analyzer, 133 decoder buffer calculator, 134 I-frame data conversion processor, 135 repeat picture adder, 136 picture data size controller, 137 PS formatter, 138 trick play stream buffer

BEST MODE OF PRACTICING THE INVENTION

First Embodiment

FIG. 1 shows a video distribution system equipped with video data processing apparatus according to a first embodiment of the invention, comprising a server that distributes video over a network and a terminal that receives and reproduces the video distributed by the server.

The video distribution system of the first embodiment implements normal play, in which the reproducing speed is the same as the speed at which the video was recorded, and trick play, in which the normal reproducing speed is changed: for example, fast-forward play at two, five, or fifteen times the normal reproducing speed; fast-rewind play at the fast-forward speed but in the reverse direction; and pause, in which the same image is displayed continuously. The video stream used in the first embodiment is assumed to have been recorded as a so-called MPEG-2 program stream; that is, an ISO/IEC 13818-1 stream.

The illustrated video distribution system includes a server 1 and terminals 51, 52, and 53, which are connected via a network 31. The terminals 51, 52, and 53 have identical configurations; only the configuration of terminal 51 is shown.

The server 1 includes a storage device 2, a stream read section 3, switches 4 and 6, a playback controller 5, a delivery section 7, a trick play processor 11, an extract section 12, and an address map 21.

The storage device 2 is provided to store video streams, and usually stores a plurality of play streams. The address map 21 stores a table associating play time stamps per GOP (Group of Pictures) of the normal play streams stored in the storage device 2 with the addresses at which the GOPs are stored in the storage device 2.

The stream read section 3 reads the GOP data of a certain stream recorded at a certain address from the storage device 2, acting on instructions from the playback controller 5 in accordance with the time stamps and address information recorded in the address map 21.

The playback controller 5 controls the flow of the stream from the storage device 2 by controlling the stream read section 3 and the switches 4 and 6, depending on whether normal play or trick play is requested from the terminal 51, 52, or 53.

The extract section 12 extracts the portions of a normal play stream from the sequence header indicating the beginning of each MPEG-2 video unit to the intra-frame coded picture data forming the first picture data. In the first embodiment, normal play streams are stored as program streams, so that the program stream is demultiplexed into elementary streams in parallel with the extraction operation.

The trick play processor 11 generates a trick play stream on the basis of the intra-frame coded pictures of a normal play stream. The trick play processor 11 includes a stream analyzer 13 for analyzing the input intra-frame coded pictures, a decoder buffer calculator 14 for performing decoder buffer calculations when a trick play stream is generated, an I-frame picture data conversion processor 15 for modifying a coding parameter of the input intra-frame coded picture, a repeat picture adder 16 for generating a repeat picture displaying content identical to the intra-frame coded picture, a picture data size controller 17 for controlling the amount of code generated in the trick play stream, and a PS (program stream) formatter 18 for multiplexing the trick play stream into a program stream having the same format as a normal play stream.

The stream analyzer 13 in the trick play processor 11 analyzes the VBV delay, temporal reference, picture coding type, code size, and other characteristics of an input intra-frame coded picture and obtains the parameters required in the trick play processor 11.

The decoder buffer calculator 14 calculates the VBV delay of the generated trick play stream in accordance with the parameters obtained by the stream analyzer 13. The method of calculating the VBV delay will be described later.

The I-frame picture data conversion processor 15 modifies the temporal reference, the VBV delay, the bit rate value from the sequence header to the intra-frame coded picture, or the VBV buffer size value, for example, to make the input intra-frame coded picture fit the trick play stream being generated.

The repeat picture adder 16 generates data having a greatly reduced code size by coding the data as skipped macroblocks having zero motion vectors and zero prediction errors, so that the same content is displayed as in the preceding intra-frame coded picture.

The picture data size controller 17 predicts the amount of code that will be generated, which is compared with the target transfer rate of the trick play stream to be generated. If the predicted code size is smaller than the target transfer rate, stuffing is inserted to match the target transfer rate. If the predicted code size seems likely to exceed the target transfer rate, the target code size is raised temporarily, and the relative bit rate value and the system clock reference (SCR) are readjusted, for example. The picture data size controller 17 controls the amount of code generated through these operations, which prevent nonconformance with the MPEG structure.

The PS formatter 18 converts the trick play stream generated as a video elementary stream into a program stream by dividing it into packs.

The delivery section 7 delivers normal play video streams and trick play video streams to terminals that have requested them, e.g., to terminal 51, through the network 31 under a video streaming transmission protocol such as, for example, the real-time transport protocol (RTP).

The terminals 51, 52, and 53 have identical configurations, as noted above; terminal 51 will be described next as an example.

Terminal 51 makes a request to the server 1 to which it is connected via the network 31, specifying a desired type of video stream, normal play or trick play, and, if trick play is desired, the reproducing direction and reproducing speed. The terminal 51 receives the video stream delivered from the server 1 and decodes it to perform normal play or trick play.

Terminal 51 includes a playback command interface 41 for input of control operations by the user, a playback command controller 42 for converting a request input by the user to an internal command and sending the command through the network to the server 1, a receiving section 43 for receiving a video stream from the server 1, a decoder 44 for decoding the received video stream, and a display unit 45 for displaying the decoded video.

The playback command interface 41 in terminal 51 receives requests from the user concerning the type of the stream to be reproduced and the type of reproduction, such as normal play, fast forward, fast rewind, or pause. The playback command controller 42 is logically connected to the server 1 through the network 31. The playback command controller 42 converts the user's requests as received by the playback command interface 41 into internal commands and sends the commands to the server 1. The receiving section 43 receives the stream to be received by the terminal 51 and extracts the necessary video stream from the received RTP packets. The decoder 44 decodes the compressed MPEG-2 stream, and the display unit 45 displays it.

Next the operation of the first embodiment will be described. First, the operations when the user of terminal 51 makes a request to play desired data in the normal manner will be described. The playback command interface 41 in terminal 51 receives the user's request concerning the type of the stream and type of reproduction (normal play). The playback command controller 42 converts the user's request into an internal command and sends the command through the network 31 to the playback controller 5 of server 1.

The playback controller 5 in the server 1 receives the command from the playback command controller 42 in terminal 51 and controls the storage device 2 and switches 4 and 6 in accordance with the command. Because normal play is selected in this example, switch 4 is set to position a, and switch 6 is set to position c.

The playback controller 5 obtains the addresses at which the stream to be played is stored in the storage device 2 from the play time stamps of the stream, with reference to the table stored in the address map 21, associating the play time stamps with the addresses. The playback controller 5 provides the stream read section 3 with instructions to read the GOP data (one GOP) recorded at each obtained address.

The stream read section 3 reads the GOP data recorded at the specified address from the storage device 2 and sends the GOP data thus read through switches 4 and 6 to the delivery section 7.

The delivery section 7 puts the normal play stream data stored as program stream data into an RTP packet and delivers the packet to the network 31 in accordance with the network bandwidth, transfer rate, and play time stamp. The RTP packet is transmitted with the IP address of the requesting terminal 51 specified, so that other terminals will not receive the packet by mistake.

After delivery of the data for one GOP, the playback controller 5 obtains the time stamp and address of the stream data to be delivered next from the address map 21 and provides the stream read section 3 with instructions to read the address at which the GOP to be played next is stored. The delivery section 7 delivers the GOP data thus read. These operations are repeated in succession to read the normal play stream and send the stream as a series of RTP packets to the network.

The operation of terminal 51 in receiving the normal play stream will now be described. The receiving section 43 in terminal 51 receives an RTP packet sent from the server 1 through the network 31 if the IP address of terminal 51 is specified as the destination. The receiving section 43 removes unnecessary RTP packet header information from the received RTP packet to convert the packet into program stream data. The decoder 44 decodes the MPEG-2 program stream, and the display unit 45 displays the decoded video.

The server 1 sends RTP packets to the terminal 51 one after another, regardless of whether terminal 51 receives or reproduces them. The receiving section 43 receives all the RTP packets having the IP address of terminal 51 as their destination and sends the received data to the decoder 44. This operation enables normal play by RTP communication between the server 1 and terminal 51.

Next the operations that implement trick play modes will be described. Fast-forward play operations will be described first. If the user makes a request for fast-forward play to the playback command interface 41 in the terminal 51, for example, the playback command controller 42 sends the corresponding command through the network 31 to the playback controller 5 of the server 1. The playback controller 5 sets switch 4 to position b and switch 6 to position d to send the video stream to the trick play processor 11 and have a trick play stream generated.

During fast-forward play in the first embodiment, not all of the GOPs need be reproduced; some GOPs may be skipped, depending on the fast-forward speed. The number of GOPs skipped also depends on the number of repeat pictures added to the trick play stream. If a trick play stream having three pictures per GOP, including two repeat pictures, is formed from a GOP including fifteen pictures, for fast-forward play at a five times the normal reproducing speed, all the GOPs in the normal play stream are read, but for fast-forward play at a fifteen times the normal reproducing speed, every third GOP is read.

The playback controller 5 provides the stream read section 3 with instructions for obtaining addresses corresponding to the time stamps of the fast-forward play stream to be reproduced from the table in the address map 21 associating the time stamps with the addresses, and for reading the data from these addresses in the storage device 2, in accordance with the fast-forward speed.

The stream read section 3 reads the GOP data of the trick play stream from the addresses in the storage device 2 and sends the data through switch 4 to the extract section 12. The extract section 12 demultiplexes the normal play stream recorded as a program stream into video elementary streams and extracts the intra-frame coded pictures. The extracted intra-frame coded pictures are sent to the trick play processor 11, where a trick play stream is generated.

The stream analyzer 13 in the trick play processor 11 extracts and analyzes the VBV delay, temporal reference, picture coding type, code size, and other parameters of the input intra-frame coded picture. The frame structure of the trick play stream to be generated is then assembled.

FIG. 2 illustrates the structure of the fast-forward play stream generated by the trick play processor 11. The original normal play stream shown at (a) has a GOP structure with parameters M=3 and N=15, where N represents the number of pictures per GOP and M represents the length (expressed in terms of the number of pictures) of the cycle at which an intra-frame coded picture or a forward predicted picture appears. The fast-forward play stream shown at (b) is generated from the normal play stream shown at (a). The fast-forward play stream starts with intra-frame coded picture $I_0$ of the normal play stream, followed by two repeat pictures $B_R$ displaying content identical to intra-frame coded picture $I_0$. This part of the trick play stream, corresponding to intra-frame coded picture $I_0$, is followed by a succeeding part including the next intra-frame coded picture $I_{15}$ and two repeat pictures $B_R$. (The successive intra-frame coded pictures $I_0$ and $I_{15}$ are intra-frame coded pictures with coding parameters modified according to the reproducing speed and direction.)

A comparison between the structures shown at (a) and (b) in FIG. 2 indicates that the number of frames per GOP is reduced from fifteen in the normal play stream to three in the fast-forward play stream, resulting in fast-forward play at five times the normal reproducing speed.

If intra-frame coded picture $I_0$ and two repeat pictures $B_R$ were to be followed by intra-frame coded picture $I_{30}$, instead of intra-frame coded picture $I_{15}$, followed by two repeat pictures $B_R$, the result would be fast-forward play at ten times the normal producing speed. The fast-forward speed can be adjusted by selecting the I-frames to be extracted from the normal play stream.

The repeat pictures are generated to display content identical to the preceding intra-frame coded picture and are coded to have zero motion vectors and zero prediction error. Skipped macroblocks are used to reduce the data size. Bidirectional predicted pictures are used as the repeat pictures here, but forward predicted pictures may also be used.

The pictures $B_1$ to $B_{14}$ in one GOP of the normal play stream are replaced by two repeat pictures $B_R$ and stuffing, as shown in FIG. 2. This greatly reduces the code size. The transfer rate of the GOP in the generated trick play stream, including intra-frame coded picture $I_0$ and two repeat pictures $B_R$, can also be reduced.

If only I-frames were to be transferred, as in conventional trick play operation, the transfer rate would become very high. The trick play stream of the first embodiment prevents the transfer rate from increasing. When fast-forward play at fifteen times the normal reproducing speed is performed by transferring only I-frames of a normal play stream having a transfer rate of 6 Mbps and a 15-frame GOP structure, an 18-Mbps bandwidth is generally needed.

With the trick play stream using two repeat pictures according to the first embodiment, five-times-normal fast-forward play reproducing all GOPs requires a 6-Mbps bandwidth, and fifteen-times-normal fast-forward play reproducing every third GOP also requires a 6-Mbps bandwidth. In the trick play stream having this structure, three identical picture frames are reproduced, but this poses no visual problems.

Bidirectional predicted pictures are used in the first embodiment, but forward predicted pictures may also be used. Two repeat pictures are used in the first embodiment because the transfer rate of the trick play stream based on the normal play stream having a transfer rate of 6 Mbps also becomes about 6 Mbps. The number of repeat pictures can be changed as required.

The decoder buffer calculator 14 calculates the VBV delay of the trick play stream on the basis of the VBV delay and the code size obtained by the stream analyzer 13. Generally, the VBV delay indicates changes in the amount of picture data in the continuous stream occupying the VBV buffer, and the value must not cause a VBV buffer overflow or underflow. The VBV delay must be determined by controlling the correct value through simulation of VBV occupancy changes. Continuous simulation of these changes would be impractical because of the enormous computational load. The decoder buffer calculator 14 of the first embodiment derives the VBV delay from simple arithmetic calculations. The simple arithmetic calculations for deriving the VBV delay of the trick play stream and the detailed calculation methods will be described later.

The I-frame picture data conversion processor 15 modifies the temporal reference, the VBV delay, the bit rate value from the sequence header to the intra-frame coded picture, or the VBV buffer size value, for example, to make the input intra-frame coded picture fit the trick play stream being generated. If the intra-frame coded picture has a temporal reference of two in the normal play stream and if one repeat picture is added to the corresponding trick play stream, the temporal reference is modified to one. The VBV delay is replaced by the VBV delay for the trick play stream calculated by the decoder buffer calculator 14.

The repeat picture adder 16 generates repeat pictures displaying content identical to the intra-frame coded picture and adds the coded data after the intra-frame coded picture. If the predicted code size is smaller than the target transfer rate, the picture data size controller 17 inserts stuffing. If the predicted code size seems likely to exceed the target transfer rate, the target code size is raised temporarily to enable the generated trick play stream data to be transferred. The PS formatter 18 multiplexes the generated trick play stream into a program stream.

The trick play stream generated in the trick play processor 11 as described above is sent through switch 6 to the delivery section 7. The delivery section 7 puts each part of the stream into an RTP packet and delivers the packet with the IP address of the requesting terminal specified as the destination. The trick play stream is delivered by repeating this operation for each GOP used in the trick play stream.

Next the operation of terminal 51 in receiving the trick play stream will be described. The receiving section 43 in terminal 51 receives RTP packets sent from the server 1 through the network 31 if the IP address of terminal 51 is specified as the destination. The receiving section 43 removes unnecessary RTP packet header information from the received RTP packets to convert them into a program stream.

The content of the converted program stream is a fast-forward play video stream having the same syntax as a normal program stream. Accordingly, the decoder 44 decodes the MPEG-2 program stream, and the display unit 45 displays the decoded video, in the same way as for normal play streams.

FIG. 3 illustrates the structure of a pause stream. The original normal play stream shown at (a) has a GOP structure with parameters M=3 and N=15; the pause stream shown at (b) is generated from the normal play stream shown at (a). The pause stream differs from the fast-forward play stream shown at (b) in FIG. 2 only in that all the I-frames are $I_0$.

The pause stream is formed by the intra-frame coded picture $I_0$ taken from the GOP at which the normal play stream pauses, followed by two repeat pictures $B_R$ displaying content identical to $I_0$. This part of the pause stream, corresponding to intra-frame coded picture $I_0$, is followed by another part including, again, intra-frame coded picture $I_0$ and two repeat pictures $B_R$. (Intra-frame coded picture $I_0$ is selected twice in a row as an intra-frame coded picture with coding parameters modified according to the reproducing speed and direction.) The resulting pause stream displays the same picture continuously. Because the same picture can be continuously displayed during the pause, the load on the server or the network may be reduced by increasing the number of repeat pictures $B_R$.

The operation that creates a pause will be described with reference to FIG. 1. The playback controller 5 continuously provides the stream read section 3 with instructions to read data recorded at the address corresponding to the same time stamp, this address being obtained by reference to the address map 21. The trick play processor 11 converts the GOP data that is read into a pause stream as shown at (b) in FIG. 3, and the delivery section 7 delivers the stream to terminal 51. The generated pause stream is structured to display the same picture continuously. Terminal 51 can display the paused image by continuing the same sequential decoding and reproducing processes as in normal play or fast-forward play operation.

FIG. 4 illustrates the structure of a fast-rewind play stream. The original normal play stream shown at (a) has a GOP structure with parameters M=3 and N=15; the fast-rewind play stream shown at (b) is generated from the normal play stream shown at (a).

The fast-rewind play stream must be structured to display pictures in the reverse direction. Therefore, in the fast-rewind play stream, intra-frame coded picture $I_{15}$ of the normal play stream is followed by two repeat pictures $B_R$ displaying content identical to intra-frame coded picture $I_{15}$, then by the preceding intra-frame coded picture $I_0$ and two repeat pictures $B_R$. (Consecutive intra-frame coded pictures $I_{15}$ and $I_0$ are intra-frame coded pictures with coding parameters modified according to the reproducing speed and direction.) The generated fast-rewind play stream displays pictures in an order reverse to the order in the normal play stream.

A comparison between the structures shown at (a) and (b) in FIG. 4 indicates that the number of frames per GOP is reduced from 15 in the original normal play stream to 3 in the fast-rewind play stream, resulting in fast-rewind play at five times the normal reproducing speed. If the intra-frame coded picture of every second GOP is used in the generated fast-rewind play stream, fast-rewind play is performed at ten times the normal reproducing speed. If the intra-frame coded picture of every third GOP is used, fast-rewind play is performed at fifteen times the normal reproducing speed.

The operation by which fast-rewind play is performed will be described with reference to FIG. 1. The playback controller 5 determines the time stamps of the data to be read from the normal play stream in accordance with the fast-rewind reproducing speed. The address corresponding to each time stamp of the data to be read is determined with reference to the address map 21, and the corresponding GOP data are read from the storage device 2. The trick play processor 11 converts the GOP data thus read into a fast-rewind play stream. The time stamp of the next data to be read is then determined in accordance with the fast-rewind reproducing speed, the corresponding address is obtained from the address map 21, and the corresponding GOP data are read from the storage device 2 and sent to the trick play processor 11. These operations are repeated to form a fast-rewind play stream as shown at (b) in FIG. 4. The generated fast-rewind play stream is delivered from the delivery section 7 to terminal 51. The fast-rewind play stream has a data structure that displays pictures in the reverse direction. Terminal 51 can perform fast-rewind play just by continuing sequential decoding and reproduction processing as in normal play.

The method of deriving the VBV delay in a trick play stream will be described next. FIG. 5(a) illustrates VBV buffer occupancy changes in the virtual decoder in a normal play stream, and FIG. 5(b) illustrates VBV buffer occupancy changes in the virtual decoder in a trick play stream. In both cases, the horizontal axis represents time, the vertical axis represents the amount of occupied VBV buffer space, and the solid line represents the VBV buffer occupancy trend.

In FIG. 5, the slope $a_N$ of the solid lines representing the changing VBV buffer occupancy level represents the transfer rate of the normal play stream. The first picture I is loaded into the VBV buffer at transfer rate $a_N$, and decoding starts after a time $\tau_{N0}$ denoting the VBV delay. At that time, a quantity $d_{N0}$ of data representing picture I is removed from the VBV buffer.

Loading of the second picture starts as soon as the loading of the first picture is completed, $d_{N1}$ being similarly removed from the VBV buffer after a time $\tau_{N1}$. The difference $x_{N0}$ between the start of the loading of adjacent pictures is expressed as:

$$x_{N0}=\tau_{N0}+\Delta f-\tau_{N1} \quad (1)$$

The notation $\Delta f$ represents the display frame interval, which is 1/29.97 for NTSC. The following relationship holds between the transfer rate and the code size $d_{N0}$:

$$d_{N0}=a_N \times x_{N0} \quad (2)$$

The same relationships hold in the trick play stream shown in FIG. 5(b):

$$x_{T0}=\tau_{T0}+\Delta f-\tau_{T1} \quad (3)$$

$$d_{T0}=a_T \times x_{T0} \quad (4)$$

where $x_{T0}$ is the difference between the start of the loading of the first and second pictures of the trick play stream; $x_{T1}$ is the difference between the start of the loading of the second and third pictures of the trick play stream; $\tau_{T0}$ is the VBV delay of the first picture of the trick play stream; $\tau_{T1}$ is the VBV delay of the second picture of the trick play stream; $d_{T0}$ is the data size of the first picture of the trick play stream; and $a_T$ is the transfer rate of the trick play stream.

If the first pictures loaded in the normal play stream and the trick play stream occupy the same VBV buffer space, the following relationship holds:

$$a_N \times \tau_{N0} = a_T \times \tau_{T0} \quad (5)$$

This relationship is represented by the dashed line in FIG. 5.

Accordingly, the following relationships are derived for the VBV delay of the trick play stream:

$$\tau_{T0}=a_N/a_T \times \tau_{N0} \quad (6)$$

$$\tau_{T1}=\tau_{T0}-d_{T0}/a_T+\Delta f \quad (7)$$

$$\tau_{T2}=\tau_{T1}-d_{T1}/a_T+\Delta f \quad (8)$$

The VBV delays of the trick play stream can be calculated from the transfer rate $a_N$ of the normal play stream, the transfer rate $a_T$ of the trick play stream, and the VBV delay $\tau_{N0}$ of the first picture of the normal play stream. Accordingly, the VBV delays of the trick play stream can be obtained through simple arithmetic calculations, without simulating VBV buffer occupancy trends.

In the description given above, the VBV delay of the trick play stream is derived through calculations. The trick play stream can also be formed by replacing all the VBV delay values with a fixed value of 0xFFFF. The VBV delay of 0xFFFF means that the stream has a variable bit rate (VBR) while a non-0xFFFF VBV delay means a constant bit rate (CBR). In the MPEG-2 structure, CBR is defined as a special form of VBR, and a generated trick play stream can normally have a VBR. In this case, no VBV delay calculations are necessary; it is only necessary to replace the data, enabling faster processing.

In the first embodiment, when trick play is implemented by a server and a terminal connected by a network, a trick play stream is generated from a normal play stream in real time, eliminating the need to prepare the trick play stream on a recording medium in advance and the need to manage pre-prepared trick play streams.

The trick play stream is generated from I-frames extracted from the normal play stream and repeat pictures having a reduced code size. The generated trick play stream therefore has a reduced code size per second, and can be transferred without increasing the network load.

The trick play stream is structured to produce a trick play effect when reproduced at the normal speed at the reproducing end. The terminal can perform a trick play without a special mechanism for reproducing the trick play stream.

When an I-frame extracted from the normal play stream is used in a trick play stream, the values of the coding parameters of the I-frame are modified according to the rules of the trick play stream and the MPEG-2 stream. Accordingly, incorrect coding parameter values will not disrupt the reproduced picture and will not cause errors in the multiplexing process.

The control parameters related to the decoder buffer, such as the VBV delay value, are adapted to fit the trick play stream to be generated, so decoder buffer failures can be prevented.

Because an appropriate VBV delay value is specified, no multiplexing errors will occur even if there is a multiplexer on the transfer path of the trick play stream.

The decoder buffer control parameters of the trick play stream are given appropriate values, which are determined from the transfer rate and the normal decoder buffer control parameters used before conversion to the trick play stream, so decoder buffer failures will not occur.

In the first embodiment, the VBV delay values can be obtained from simple arithmetic calculations. Compared with the method of obtaining the VBV delays through simulation of the decoder buffer, this imposes less load on the system. The VBV delays can be obtained faster, and without increasing the system load.

If decoder buffer control parameters such as the VBV delay are given meaningful fixed values such as 0xFFFF, even simple arithmetic calculations are not required. The decoder buffer control parameters such as the VBV delay can be set so as to require almost no processing time and impose almost no added load on the system.

The transfer rate can be adjusted easily, either to match the transfer rate of a normal play stream or to vary the transfer rate just for trick play, because although the code size of a trick play stream may vary, when the generated code size is too small, stuffing can be inserted, and when the generated code size is too large, the target code rate can be raised temporarily.

Stuffing provided to adjust the transfer rate may be inserted evenly after each repeat picture to ensure a uniform picture code size or a uniform VBV delay.

A trick play stream reproduced over a network according to the first embodiment will experience no image disruption.

Second Embodiment

Figure 6:
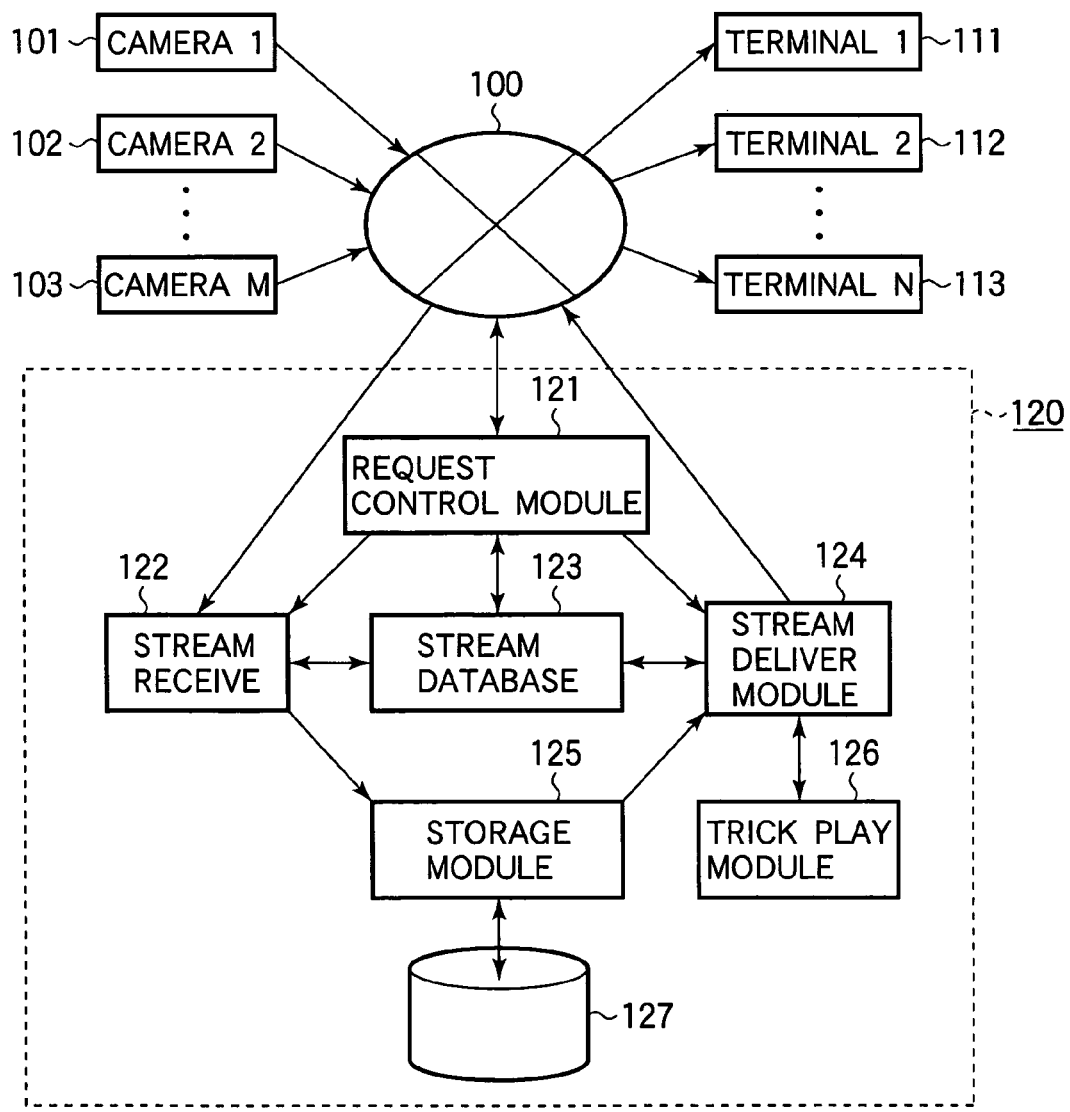
FIG. 6 is a block diagram schematically showing a wide-area surveillance system equipped with video data processing apparatus according to a second embodiment of the invention.

FIG. 6 is a diagram showing a wide-area surveillance system equipped with video data processing apparatus according to a second embodiment of the invention. In the system of the second embodiment, a server 120 stores pictures taken by cameras 101 to 103, and the stored pictures can be viewed from a plurality of terminals 111 to 113. Desired pictures can be reproduced at normal speed at the terminals, and trick play operations such as fast-forward play, fast-rewind play, and pause can also be executed.

The cameras 101 to 103 take pictures, compress the pictures into MPEG-2 program streams, parcel the streams into RTP/user-datagram-protocol (UDP) packets, and send the packets through a network 100 to the server 120.

The server 120 has three functions for storing the video streams taken by the cameras 101 to 103: a primary storage server function for receiving and storing multicast streams from the cameras 101 to 103 continuously and endlessly, an alarm storage server function for receiving and storing multicast streams from the cameras 101 to 103 when triggered by an alarm, and an image storage server function for saving video streams stored in a different server, not shown in FIG. 6. The server 120 can be set to one of the three storage functions at initialization. The server 120 described below is initialized as a primary storage server.

The server 120 includes a request control module 121, a stream receive module 122, a stream database 123, a stream deliver module 124, a storage module 125, a trick play module 126, and a hard disk drive (HDD) 127.

The request control module 121 is provided to process external requests for storage or delivery; when it receives such a request from one of the terminals 111 to 113 or the other server not shown in FIG. 6, it controls the other modules in the server 120 via an internal interface and sends an acknowledging message to the requesting terminal or server. The request control module 121 supports the real time streaming protocol (RTSP) and allows normal play and trick play of a video stream stored in the server 120. The request control module 121 also has search functions that make use of the stream database 123, allowing a video stream to be retrieved by time or camera used.

The stream receive module 122 receives multicast streams delivered from the cameras 101 to 103. The advantages of multicast delivery by the cameras 101 to 103 are that a single video stream can be stored by different servers simultaneously and that a picture taken by a camera can be directly viewed at the terminals 111 to 113. If transmission to the server 120 alone is desired, unicasting may also be performed. The stream receive module 122 receives an RTP/UDP packet if the port number and the IP address of the server 120 or the multicast address are specified as the destination. The stream receive module 122 also obtains the time when the first piece of GOP data sent as an RTP/UDP packet is received and uses it as a time stamp. The RTP/UDP header is removed from each received RTP/UDP packet, and the payload portions of the RTP/UDP packets are combined into a program stream.

The storage module 125 stores the video stream received as program streams a GOP at a time in the hard disk drive 127 and manages the data stored in the hard disk drive 127 in units of GOPs.

The stream database 123 provides functions to record, manage, and retrieve meta-information about (information indicating the structure and attributes of the content of) GOPs and video streams managed and stored by the storage module 125. The meta-information of a video stream includes, for example, the camera number, the video compression method and compression level, the time stamps obtained by the stream receive module 122, and the time at which the stream was taken.

At the request of the request control module 121, the stream deliver module 124 delivers video streams managed by the storage module 125 to the network 100. When a video stream is delivered through the network 100 to terminal 111, for example, the program stream data is sent as a series of RTP/UDP packets, with the IP address of terminal 111 specified as the destination, and the transmission timing is controlled on a GOP basis in accordance with the reception time stamps of the GOPs recorded in the stream database 123.

To deliver a trick play stream, a normal play stream read from the storage module 125 is transferred to the trick play module 126, where a trick play stream is generated. A fifteen-times-normal fast-forward or fast-rewind play stream, for example, must be delivered at timings such that the GOPs arrive at intervals equal to $\frac{1}{15}$ their reception time stamp intervals. The trick play module 126 is given intra-frame coded pictures (I-frames) extracted from the normal play stream and parameters needed to generate a trick play stream, such as the transfer rate of the normal play stream and the desired transfer rate of the trick play stream, and generates the trick play stream accordingly.

The video streams stored in the server 120 can be viewed at terminals 111 to 113 if a play request is sent to the request control module 121 of the server 120. When terminal 111 sends a request for a desired video stream to the server 120, for example, the server 120 delivers the corresponding video stream as a series of RTP/UDP packets. Terminal 111 receives the RTP/UDP packets having the corresponding port number and IP address via the network and reproduces the requested video stream.

The trick play module 126 will now be described with reference to FIG. 7. The trick play module 126 includes an I-frame buffer 131 for receiving I-frames transferred from the stream deliver module 124, a stream analyzer 132 for analyzing the data structure and coding parameters of the received I-frame data, a decoder buffer calculator 133 for calculating the VBV delay of the trick play stream to be generated, an I-frame data conversion processor 134 for modifying the parameters of the I-frame data used in the trick play stream, a repeat picture adder 135 for generating and adding repeat pictures displaying the same content as a preceding I-frame, a picture data size controller 136 for controlling the quantity of code generated in the trick play stream to match a target transfer rate, a PS formatter 137 for converting the generated trick play stream into a program stream, and a trick play stream buffer 138 for holding the trick play stream to be transferred to the stream deliver module 124.

Next the operation of the second embodiment will be described. The server 120 described below is set up as a primary storage server for receiving and storing multicast streams continuously and endlessly from cameras 101 to 103. After the server 120 is set up as the primary storage server, the stream receive module 122 of the server 120 monitors the RTP/UDP packets on the network 100 continuously and receives the RTP/UDP packets if they have the corresponding IP address or a multicast address and the corresponding port number as their destination.

The video stream received by the stream receive module 122 as a series of RTP/UDP packets is converted to a program stream and is recorded in the hard disk drive 127, GOP by GOP, each time the received packet(s) form a GOP. The stream database 123 records the time when the GOP is received by the server 120 as a reception time stamp and also records the camera information, the video compression method and compression level, and other meta-information. The video stream is stored in the server 120 by repetition of this operation.

Normal play operation will be described next. The operation of terminal 111 in selecting and reproducing a desired picture will be described first. Terminal 111 starts by obtaining a list of video streams stored in the server 120 from the request control module 121. The list of stored video streams can be obtained by performing a search by means of the search function of the stream database 123, without specifying any key. Terminal 111 selects a desired video stream from the video stream list thus obtained. The video streams are given unique video IDs; each video stream is identified by its video ID.

Next terminal 111 issues a play request command to the request control module 121 to reproduce the selected video stream. The request control module 121 accepts the play request and sends the stream deliver module 124 instructions to start reproducing the specified video stream. The stream deliver module 124 identifies the video stream having the specified video ID and the GOPs matching the reproduction time and gives the storage module 125 instructions to reproduce the video stream. The storage module 125 reads the GOPs of the identified video stream from the hard disk drive 127 and sends the GOPs to the stream deliver module 124. The stream deliver module 124 delivers the GOPs obtained from the storage module 125.

The storage module 125 delivers the GOPs of the video stream as a series of RTP/UDP packets, specifies the IP address and the port number of terminal 111 as the destination, and controls the delivery timing in accordance with the reception time, which is one of the meta-information items recorded in the stream database 123. In other words, the stream deliver module 124 delivers the GOPs so as to reproduce the timing of the reception time stamps indicating the time when the stream receive module 122 received the GOPs. The timing of delivery of encoded video data from the camera is thereby reproduced, and consequently real-time simultaneous decoding and reproduction can be performed without causing any buffer overflow or underflow in the network or in the reproducing environment.

The requesting terminal 111 receives the RTP/UDP packets delivered from the storage module 125. Terminal 111 removes the RTP/UDP headers from the continuously delivered RTP/UDP packets and combines a plurality of RTP/UDP packet payloads to obtain a normal play stream formatted as a program stream. Accordingly, terminal 111 can obtain a video stream stored in the server 120 and can also reproduce a video stream obtained by an internal decoder, which is not shown in the figure.

Next the operations that implement trick play modes will be described. Fast-forward play operations will be described as a representative example. To simplify the description, it will be assumed that the normal play data of MPEG-2 program streams are stored with a parameter N=15.

If just the I-frames in the GOPs were to be reproduced in succession, fast-forward play would be performed at fifteen times the normal reproducing speed, but when a fast-forward stream is generated by adding two repeat pictures after each I-frame, fast-forward play is performed at five times the normal reproducing speed. The fast-forward play speed can be increased by reading separated GOPs, such as every third GOP for fifteen-times-normal fast-forward play and every sixth GOP for thirty-times-normal fast-forward play. The operations described below are performed when terminal 111 makes a request for fifteen-times-normal fast-forward play of a certain video stream.

Terminal 111 sends a request for fast-forward play to the request control module 121 of the server 120, specifying the video ID as in normal play operations. The request control module 121 receives the play request and sends a fast-forward play command and the selected video ID to the stream deliver module 124. The stream deliver module 124 obtains the meta-information of the video stream having the selected video ID from the stream database 123 and determines the GOPs to be read to perform fifteen-times-normal fast-forward play.

Figure 8:
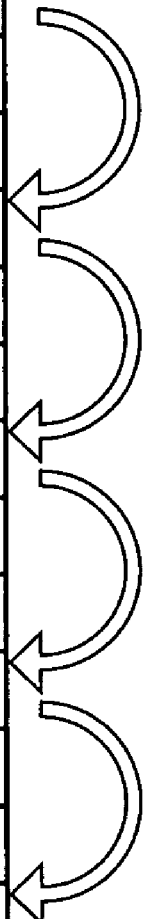
FIG. 8 illustrates GOP time stamps in the second embodiment of the invention.

FIG. 8 illustrates the GOP time stamps. In a GOP structure including two repeat pictures with a parameter value of N=15, to perform a fifteen-times-normal fast-forward play, for example, every third GOP shown in FIG. 8 should be read. The GOPs to be read are thus determined in accordance with the fast-forward play speed. The storage module 125 reads these GOPs from the hard disk drive 127. The stream deliver module 124 extracts the I-frames from the normal play stream data of the GOPs and sends the I-frames to the trick play module 126.

Figure 7:
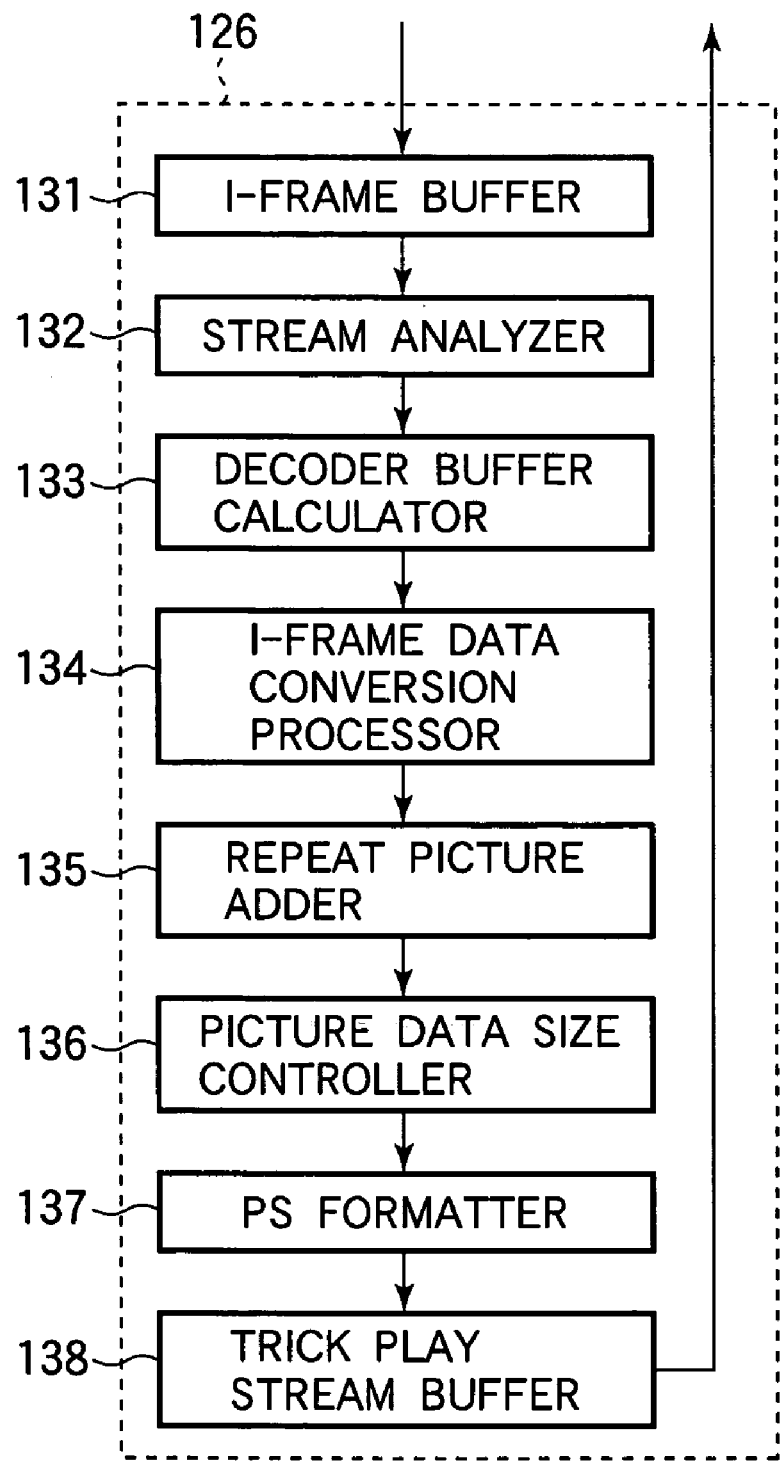
FIG. 7 is a block diagram of the trick play module in the second embodiment of the invention.

The I-frame buffer 131 in the trick play module 126 shown in FIG. 7 stores the I-frame data sent from the stream deliver module 124. The stream analyzer 132 analyzes the VBV delay, the temporal reference, the picture decoding type, and the code size of the I-frame data stored in the I-frame buffer 131 and obtains parameters needed in the trick play module 126.

The decoder buffer calculator 133 calculates the VBV delay of the generated trick play stream in accordance with the parameters obtained by the stream analyzer 132, using the method of calculating the VBV delay that was used in the first embodiment.

The I-frame data conversion processor 134 modifies the temporal reference, the VBV delay, the bit rate value from the sequence header to the intra-frame coded picture, and/or the VBV buffer size value, for example, to make the input intra-frame coded picture fit the trick play stream being generated.

The repeat picture adder 135 generates repeat picture data having a greatly reduced code size by coding the data as skipped macroblocks having zero motion vectors and zero prediction error, so that the same content is displayed as in the preceding intra-frame coded picture.

The picture data size controller 136 predicts the amount of code that will be generated, which is compared with the target transfer rate of the trick play stream to be generated. If the predicted code size is smaller than the target transfer rate, stuffing is inserted to match the target transfer rate. If the predicted code size seems likely to exceed the target transfer rate, the target code size is raised temporarily, and the relative bit rate value and the SCR are readjusted, for example. The picture data size controller 136 controls the amount of code generated through these operations, which prevent nonconformance with the MPEG structure.

The PS formatter 137 also converts the trick play stream generated as a video elementary stream into a program stream by dividing it into packs. The generated program stream is stored in the trick play stream buffer 138, and the corresponding data are furnished to the stream deliver module 124.

The stream deliver module 124 parcels the received trick play stream into RTP/UDP packets as if it were a normal play stream and specifies the IP address and the port number of terminal 111 as the destination. The stream deliver module 124 also controls the delivery timing of the GOPs in accordance with their GOP reception time stamps, which form part of the meta-information in the delivery data recorded in the stream database 123, and the fast-forward play speed, such as ¹⁄₁₅ reception time stamp intervals between GOPs for fifteen-times-normal fast-forward play. The requesting terminal 111 receives the RTP/UDP packets delivered from the stream deliver module 124.

Terminal 111 removes the RTP/UDP headers from the continuously delivered RTP/UDP packets to create a packetized program stream and combines the packet payloads to obtain a trick play stream. Fifteen-times-normal fast-forward play can then be obtained by reproducing the resulting trick play stream in the same way as a normal play stream. The trick play stream has the same syntax as a normal program stream and can be processed in the same way as a normal play stream. By processing it, terminal 111 can reproduce the received trick play stream.

Fifteen-times-normal fast-forward play has been described above. Thirty-times-normal fast-forward play can be obtained by reading the I-frame of every sixth GOP and delivering data at ¹⁄₃₀ time intervals in accordance with the time table. Fast-rewind play can be performed by sending the data to the trick play module 126 data read in the reverse direction. A pause can be implemented by sending the same GOP data repeatedly to the trick play module 126.

A fast-forward play stream and a fast-rewind play stream can be delivered in real time by determining the delivery timing from the reception time stamps. A pause stream is delivered in accordance with time information generated for the pause stream itself, because all GOPs have the same reception time stamps and there would be no point in using the reception time table.

The trick play stream of the second embodiment is structured to produce a trick play effect when reproduced at the normal speed at the reproducing end. The reproducing end can perform a trick play without a special mechanism for reproducing trick play streams.

When the play mode is switched from normal play to trick play or from trick play to normal play without interruption, the continuity of the time information in the program stream, such as the system clock reference (SCR), the presentation time stamp (PTS), and the decoding time stamp (DTS), must be ensured. A discontinuity of the time information might cause a decoder buffer overflow or underflow in some decoders, or might interrupt or halt decoding.

When the play mode is switched between normal play and trick play, the SCR of the stream that follows the switchover should be offset so that the SCR values continue from the last SCR of the preceding stream. The PTS and DTS values in the following stream should be offset by amounts equivalent to the SCR offset.

In the second embodiment, when trick play is implemented by a server and a terminal connected by a network, a trick play stream is generated from a normal play stream in real time, eliminating the need to prepare the trick play stream on a recording medium in advance and the need to manage pre-prepared trick play streams.

The trick play stream is generated from I-frames extracted from the normal play stream and repeat pictures having a reduced code size. The generated trick play stream therefore has a reduced code size per second, and can be transferred without increasing the network load.

The trick play stream is structured to produce a trick play effect when reproduced at the normal speed at the reproducing end. The terminal can perform a trick play without a special mechanism for reproducing the trick play stream.

When an I-frame extracted from the normal play stream is used in a trick play stream, the values of the coding parameters of the I-frame are modified according to the rules of the trick play stream and MPEG-2 streaming rules. Accordingly, incorrect coding parameter values will not disrupt the reproduced picture and will not cause errors in the multiplexing process.

The control parameters related to the decoder buffer, such as the VBV delay value, are adapted to fit the trick play stream to be generated, so decoder buffer failures can be prevented.

Because an appropriate VBV delay value is specified, no multiplexing errors will occur even if there is a multiplexer on the transfer path of the trick play stream.

The decoder buffer control parameters of the trick play stream are given appropriate values, which are determined from the transfer rate and the normal decoder buffer control parameters used before conversion to the trick play stream, so decoder buffer failures will not occur.

The decoder buffer control parameters can be obtained from simple arithmetic calculations. The parameters can be obtained quickly, and without increasing the system load.

If decoder buffer control parameters are given fixed values, the decoder buffer control parameters can be set so as to require almost no processing time and impose almost no added load on the system.

The transfer rate can be adjusted easily, either to match the transfer rate of a normal play stream or to vary the transfer rate just for trick play, because although the code size of a trick play stream may vary, when the generated code size is too small, stuffing can be inserted, and when the generated code size is too large, the target code rate can be raised temporarily.

According to the second embodiment, a trick play stream reproduced over a network will experience no image disruption.

What is claimed is:

1. A video data processing method that generates a trick play stream with an altered reproducing speed and reproducing direction from a video stream coded using frame-to-frame prediction, comprising:
    a step of selectively extracting intra-frame coded pictures from the video stream, conforming to the speed and direction of the trick play stream to be reproduced;
    an analysis step of analyzing a coding parameter of the extracted intra-frame coded pictures;
    a modification step of modifying the coding parameter according to said speed and direction; and
    a generating step of generating the trick play stream by generating repeat pictures displaying content identical to the extracted intra-frame coded pictures and adding the repeat pictures following the intra-frame coded pictures with the modified coding parameter, the intra-frame coded pictures with the modified coding parameter being selected in their order of data transfer according to said reproducing speed and reproducing direction.

2. The video data processing method of claim 1, wherein:
    the analysis step analyzes a control parameter of the extracted intra-frame coded pictures related to a decoder buffer; and
    the modification step modifies the control parameter related to the decoder buffer so that the transferred trick play stream does not produce a failure of the decoder buffer.

3. The video data processing method of claim 2, wherein the modification step derives the control parameter of the extracted intra-frame coded pictures related to the decoder buffer from the analyzed parameters for decoder buffer control, a transfer rate of the video stream, and a transfer rate of the generated trick play stream.

4. The video data processing method of claim 2, wherein the modification step sets the control parameter of the extracted intra-frame coded pictures related to the decoder buffer to an arbitrary fixed value independent of code structures of the video stream and the generated trick play stream.

5. The video data processing method of claim 1, further comprising a step of adjusting a quantity of code generated in the trick play stream by stuffing to match a target transfer rate when the quantity of code is predicted to underrun the target transfer rate, and temporarily raising the target transfer rate when the quantity of code is predicted to overrun the target transfer rate.

6. A video data processing apparatus that generates a trick play stream with an altered reproducing speed and reproducing direction from a video stream coded using frame-to-frame prediction, comprising:
   means for selectively extracting intra-frame coded pictures from the video stream, conforming to the speed and direction of the trick play stream to be reproduced;
   analysis means for analyzing a coding parameter of the extracted intra-frame coded pictures;
   modification means for modifying the coding parameter according to said speed and direction; and
   generating means for generating the trick play stream by generating repeat pictures displaying content identical to the extracted intra-frame coded pictures and adding the repeat pictures following the intra-frame coded pictures with the modified coding parameter, the intra-frame coded pictures with the modified coding parameter being selected in their order of data transfer according to said reproducing speed and reproducing direction.

7. The video data processing apparatus of claim 6, wherein:
   the analysis means analyzes a control parameter of the extracted intra-frame coded pictures related to a decoder buffer; and
   the modification means modifies the control parameter related to the decoder buffer so that the transferred trick play stream does not produce a failure of the decoder buffer.

8. The video data processing apparatus of claim 7, wherein the modification means derives the control parameter of the extracted intra-frame coded pictures related to the decoder buffer from the analyzed parameters for decoder buffer control, a transfer rate of the video stream, and a transfer rate of the generated trick play stream.

9. The video data processing apparatus of claim 7, wherein the modification means sets the control parameter of the extracted intra-frame coded pictures related to the decoder buffer to an arbitrary fixed value independent of code structures of the video stream and the generated trick play stream.

10. The video data processing apparatus of claim 6, further comprising a means for adjusting a quantity of code generated in the trick play stream by stuffing to match a target transfer rate when the quantity of code is predicted to underrun the target transfer rate, and temporarily raising the target transfer rate when the quantity of code is predicted to overrun the target transfer rate.

* * * * *